No. 830,932. PATENTED SEPT. 11, 1906.
R. G. SCOTT.
WEIGHING AND BAGGING MACHINE.
APPLICATION FILED SEPT. 8, 1905.

2 SHEETS—SHEET 1.

No. 830,932. PATENTED SEPT. 11, 1906.
R. G. SCOTT.
WEIGHING AND BAGGING MACHINE.
APPLICATION FILED SEPT. 8, 1905.

2 SHEETS—SHEET 2.

UNITED STATES PATENT OFFICE.

ROY G. SCOTT, OF McGREGOR, INDIANA.

WEIGHING AND BAGGING MACHINE.

No. 830,932.

Specification of Letters Patent.

Patented Sept. 11, 1906.

Application filed September 8, 1905. Serial No. 277,484.

*To all whom it may concern:*

Be it known that I, ROY G. SCOTT, a citizen of the United States, residing at McGregor, in the county of Jefferson and State of Indiana, have invented certain new and useful Improvements in Weighing and Bagging Machines, of which the following is a specification.

My invention relates to machines for weighing and bagging grain, &c., and has for its object the construction of a machine consisting of two weighing-machines, each of which is arranged to receive a bag or sack for containing the grain, a trough for conveying the grain, &c., to each sack from a common hopper, and a valve operated by the weighing-machines for conducting the grain from the hopper to the two troughs alternately. An elevator may be used for conveying the grain to the hopper or other means employed, if desired. A register is also provded and so connected with the valve in the hopper that an accurate record may be kept of the amount of grain weighed and bagged.

The construction and advantages of my invention will be fully explained hereinafter and illustrated in the accompanying drawings, in which—

Figure 1:
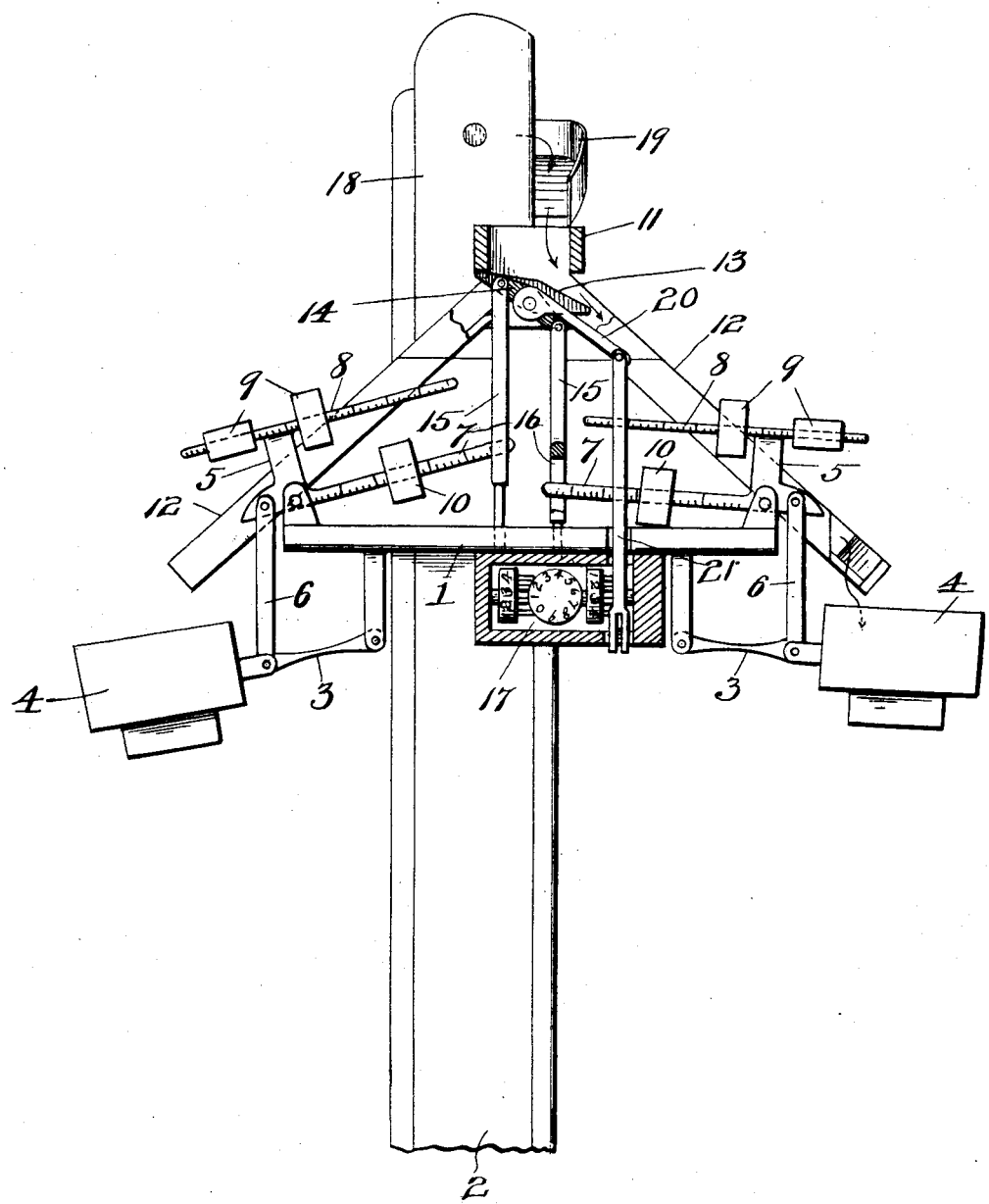
Figure 2:
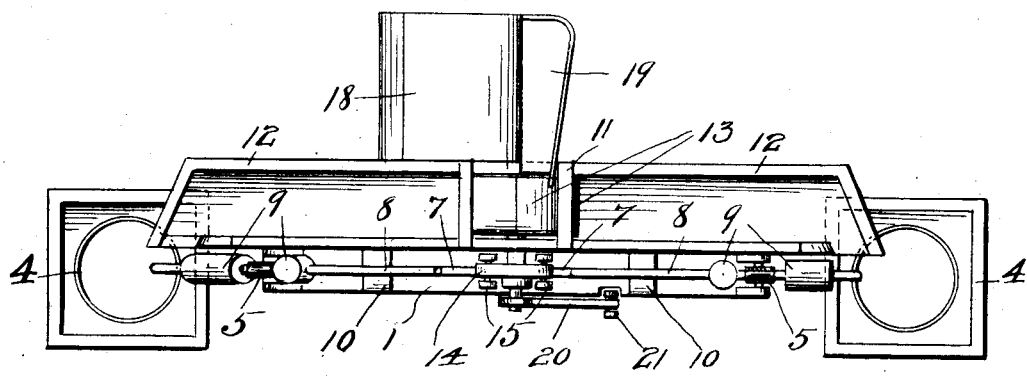
Figure 3:
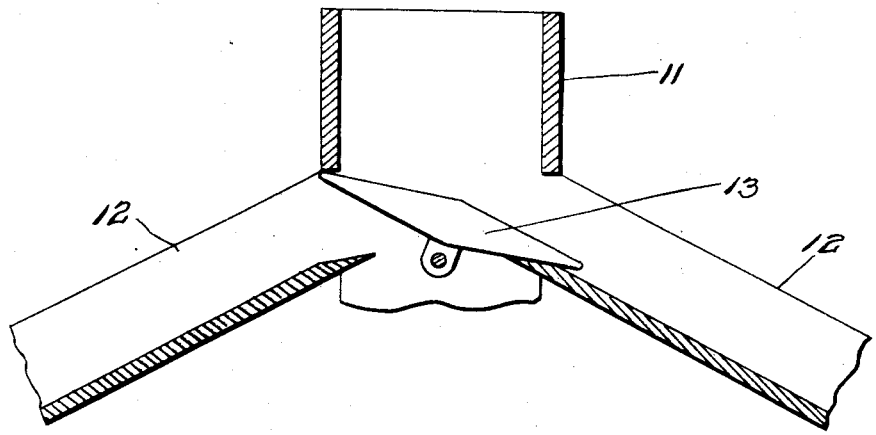

Figure 1 is a front view, partly in section, of my improved weighing and bagging machine, showing it in combination with a grain-elevator; Fig. 2, a top plan view, and Fig. 3 a side view.

In the drawings, similar reference characters indicate corresponding parts throughout the several views.

1 represents a platform suitably secured in any position desired, being shown in the drawings as secured to the frame of an elevator 2.

3 represents arms pivotally secured to the platform 1 and having bag-holding funnels 4 secured to their free ends.

5 represents scale-beams pivotally mounted on platform 1 and connected, by means of rods 6, with arms 3. The scale-beams 5 consist of two graduated beams, as shown, the lower one, 7, being longer than the upper one, 8, and have weights 9 adjustably mounted thereon.

10 represents a counterweight mounted on each beam 5 to accurately balance it.

11 represents a hopper supported on platform 1, and 12 troughs leading from the hopper 11 to each funnel 4.

13 represents a valve pivotally secured in hopper 11 and so arranged that the contents of the hopper may be directed into either trough 12.

14 represents a crank-arm secured to valve 13, and 15 rods pivotally secured to each end of the arm, having their lower ends bifurcated, as shown at 16, and each straddling the end of the lower graduated beam 7 of one of the scale-beams 5.

By this construction it will be seen that when the valve 13 has been set to direct the contents of hopper 11 into one or the other of the funnels 4 and the bag secured thereto they will continue to flow therein until the weight thereof is sufficient to raise the scale-beam 5, secured to said funnel, when the lower beam 7 will raise the rod 15 on the corresponding end of the crank-arm 14 and swing the valve 13 so that the contents of the hopper will be directed into the other trough 12, leading to the other funnel 4, when the operation just described is repeated. While one bag is being filled it will be understood that the filled bag at the other end of the machine may be taken from its funnel and an empty bag secured thereto.

17 represents a register connected with the valve 13 so as to keep an account of the number of times the valve is oscillated, and consequently of the amount of grain, &c., weighed and bagged.

It will be apparent that my machine may be fed in any suitable manner; but in the drawings I have shown an endless-belt conveyer 18, having at its delivery end a trough 19, leading to the hopper 11 for the purposes of illustration.

Having thus described my invention, what I claim is—

In a weighing and bagging machine, a platform suitably secured, scale-beams pivotally mounted on the platform, arms pivotally secured to said platform, rods connecting said scale-beams and arms, bag-holders at the ends of said arms, a hopper above said platform, a trough leading from said hopper to each bag-holder, a valve to direct the contents of the hopper exclusively into one or the other of said troughs, a crank-arm secured to said valve, and rods secured to said
5 crank-arm and having bifurcated ends to straddle said scale-beams, substantially as shown and described.

In testimony whereof I hereto affix my signature in the presence of two witnesses.

ROY G. SCOTT.

Witnesses:
GEO. T. MAYFIELD,
JOHN L. FRENCH.